(12) United States Patent
Cammenga et al.

(10) Patent No.: US 11,709,381 B2
(45) Date of Patent: Jul. 25, 2023

(54) HIGH REFLECTANCE HEADS-UP DISPLAY WITH DISPLAY ELEMENT CONCEALMENT

(71) Applicant: GENTEX CORPORATION, Zeeland, MI (US)

(72) Inventors: David J. Cammenga, Zeeland, MI (US); Adam R. Heintzelman, Grand Rapids, MI (US); Gary J. Dozeman, Zeeland, MI (US); Ryan B. Balili, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 174 days.

(21) Appl. No.: 17/140,475

(22) Filed: Jan. 4, 2021

(65) Prior Publication Data
US 2021/0208426 A1  Jul. 8, 2021

Related U.S. Application Data

(60) Provisional application No. 62/957,375, filed on Jan. 6, 2020.

(51) Int. Cl.
*G02F 1/01* (2006.01)
*G02B 27/01* (2006.01)
(Continued)

(52) U.S. Cl.
CPC ............ *G02F 1/0121* (2013.01); *B60K 35/00* (2013.01); *G02B 5/205* (2013.01); *G02B 27/0101* (2013.01); *B60K 2370/1529* (2019.05); *B60K 2370/25* (2019.05); *B60K 2370/349* (2019.05); *B60K 2370/52* (2019.05); *B60K 2370/65* (2019.05)

(58) Field of Classification Search
None
See application file for complete search history.

(56) References Cited

U.S. PATENT DOCUMENTS

2005/0270655 A1   12/2005  Weber et al.
2008/0264466 A1*  10/2008  Cuma ................... B60J 3/04
                                              136/244

(Continued)

FOREIGN PATENT DOCUMENTS

JP    2008070504 A   3/2008
JP    2012108470 A   6/2012

OTHER PUBLICATIONS

International Search Report dated Apr. 15, 2021, for corresponding PCT application No. PCT/US2021/012052, 3 pages.
(Continued)

*Primary Examiner* — Christopher R Lamb
(74) *Attorney, Agent, or Firm* — Price Heneveld LLP; Brian James Brewer

(57) ABSTRACT

A heads-up display may comprise a viewing screen having a reflective surface; a housing defining an opening; a display element disposed within the housing and comprising an integral linear polarizer configured to polarize light in a first direction; and a first linear polarizer disposed between the display element and the viewing screen covering the opening defined by the housing configured to polarize light in the first direction. The display element may be capable of causing images to be displayed on the viewing screen.

19 Claims, 3 Drawing Sheets

(51) Int. Cl.
*G02B 5/20* (2006.01)
*B60K 35/00* (2006.01)

(56) References Cited

U.S. PATENT DOCUMENTS

| | | | |
|---|---|---|---|
| 2014/0022491 A1* | 1/2014 | Wiendorf | G02F 1/133617 349/62 |
| 2014/0292831 A1* | 10/2014 | Toyoda | G09G 5/10 345/690 |
| 2017/0255300 A1 | 9/2017 | Lindahl et al. | |
| 2017/0315352 A1* | 11/2017 | Hardy | G02B 27/14 |
| 2018/0017823 A1* | 1/2018 | Saenger Nayver | G02F 1/157 |
| 2018/0341109 A1* | 11/2018 | Lin | G02B 27/01 |
| 2019/0011796 A1 | 1/2019 | Cammenga et al. | |
| 2019/0255946 A1* | 8/2019 | Takahashi | G02B 17/0668 |
| 2019/0293931 A1* | 9/2019 | Yamamoto | B60K 35/00 |

OTHER PUBLICATIONS

Written Opinion dated Apr. 15, 2021, for corresponding PCT application No. PCT/US2021/012052, 5 pages.

\* cited by examiner

HIGH REFLECTANCE HEADS-UP DISPLAY WITH DISPLAY ELEMENT CONCEALMENT

CROSS REFERENCE TO RELATED APPLICATIONS

This application claims the benefit of and priority to U.S. Provisional Patent Application No. 62/957,375, filed on Jan. 6, 2020, entitled "High Reflectance Heads-Up Display With Display Element Concealment," the entire disclosure of which is hereby incorporated herein by reference.

FIELD OF THE DISCLOSURE

This disclosure relates generally to heads-up displays, and in particular, to concealing various components of heads-up displays.

BACKGROUND

Heads-up displays (HUD) may be used in automotive and aerospace applications. A typical HUD uses a light-producing display element and a reflective viewing screen or display surface to direct the light from the display element toward the observer. The light from the display element, hereinafter referred to as display light, may be reflected either from a viewing screen disposed on the windshield of a vehicle or from a combiner screen located near the windshield. For aesthetic reasons, it may be desirable to locate the display element in a location where it cannot easily be seen by an observer.

In many HUD devices, especially automotive ones, the display element may be disposed in or on a vehicle dashboard. The display element and other components of the HUD, such as wiring, connectors, and the like may be disposed within a housing recessed into the dashboard or within a recess in the dashboard. The housing or recess may define an opening in the dashboard, and a cover may be disposed over the opening. The cover may be flush with the dashboard surface.

The viewing screen of the HUD may both reflect the display light and allow ambient light to pass through the viewing screen. This may allow the observer the benefit of being able to see the display light simultaneously with objects on the far side of the combiner screen or windshield from the observer. The display light may appear to be superimposed over the objects seen through the combiner screen or windshield.

The brightness of the display image on the viewing screen may be proportional to the reflectance of the viewing screen, with viewing screens having higher reflectance displaying brighter display images. Brighter display images on the viewing screen may be easier for an observer to see. However, the higher screen reflectance that allows the brighter display images may also cause increased visibility of the display element and other HUD components disposed below the cover and within the dashboard, especially when the HUD is not in use. For example, ambient light may enter the housing or recess and impinge on the display element and other HUD components disposed within, thereby illuminating the components disposed therein. A reflection of the elements may then be seen on the viewing screen. This may be undesirable in that HUD displays are typically designed to create an aesthetically pleasing image that appears to come from nowhere. If the workings in the display area become more noticeable, the HUD may be less desirable.

SUMMARY

According to an aspect, a heads-up display may comprise a viewing screen having a reflective surface, a volume defining a recess having an opening, a display element in optical communication with the viewing screen, and a first linear polarizer disposed to cover the opening and configured to polarize light in a first direction. The display element may be disposed within the recess. The display element may comprise an integral linear polarizer configured to polarize light in the first direction. The display element may be capable of causing images and/or information to be displayed on the viewing screen. The volume may comprise a dashboard of a vehicle. A housing may be disposed within the recess. The heads-up display may further comprise an electro-optic element disposed on a surface of the viewing screen. The electro-optic element may be capable of darkening and clearing to control light transmission based on ambient light conditions. The viewing screen may comprise a reflective surface. The viewing screen may comprise a reflective polarizer. The viewing screen may have a reflectance greater than about thirty percent. The heads-up display system further may comprise a neutral density filter disposed generally parallel to and in proximity to the first linear polarizer.

According to an aspect, a heads-up display may comprise a viewing screen having a reflective surface; a housing defining an opening; a display element disposed within the housing and a first integral linear polarizer configured to polarize light in a first direction disposed between the display element and the viewing screen. The first linear polarizer may cover the opening defined by the housing and may be configured to polarize light in the first direction. The display element may be capable of causing images and/or information to be displayed on the viewing screen.

The heads-up display further may comprise an electro-optic element disposed on a surface of the viewing screen. The electro-optic element may be capable of darkening and clearing to control light transmission through the viewing screen based on ambient light conditions. The viewing screen may comprise a reflective surface. The viewing screen may comprise a reflective polarizer. The viewing screen may have a reflectance greater than about thirty percent. The heads-up display system further may comprise a neutral density filter disposed generally parallel to and in proximity to the first linear polarizer.

According to an aspect, a heads-up display disposed within a vehicle may comprise a viewing screen extending generally from a first A-pillar of the vehicle to a second A-pillar of the vehicle; and a display element capable of causing images and/or information to be displayed on the viewing screen. The display element may be capable of displaying a first set of images on a first portion of the display element and a second set of images on a second portion of the display element; the first portion of the display element may be associated with a first occupant position of the vehicle; and the second portion of the display element may be associated with a second occupant position of the vehicle.

The display element may be capable of first displaying the first set of images on the first portion of the display element, then subsequently displaying the first set of images on the second portion of the display element. The heads-up display further may comprise a housing defining an opening; and the display element may be disposed within the housing. The heads-up display further may comprise a linear polarizer disposed to cover the opening defined by the housing. The heads-up display further may comprise an electro-optic element disposed on a surface of viewing screen. The electro-optic element may be capable of darkening and clearing to control light transmission based on ambient light conditions. The viewing screen may comprise a reflective polarizer.

According to an aspect, a heads-up display system may comprise a viewing screen extending generally the width of the windshield of a vehicle or along at least half of the width of the windshield. This may comprise extending from proximate a first A-pillar of the vehicle to proximate a second A-pillar of the vehicle. The viewing screen may have a reflective surface, a housing defining an opening, a display element capable of causing images to be displayed on the viewing screen disposed within the housing and may comprise an integral linear polarizer configured to polarize light in a first direction. Viewing screen may further comprise a first linear polarizer disposed between the display element and the viewing screen covering the opening defined by the housing and configured to polarize light in the first direction. The display element may be capable of displaying a first set of images on a first portion of the display element and a second set of images on a second portion of the display element. The first portion of the display element may be associated with a first occupant position of the vehicle; and the second portion of the display element may be associated with a second occupant position of the vehicle. The heads-up display system further may comprise an electro-optic element disposed on a surface of the viewing screen; and the electro-optic element may be capable of darkening and clearing to control light transmission through the display element based on ambient light conditions. The heads-up display system further may comprise a neutral density filter disposed generally parallel to and in proximity to the first linear polarizer.

According to an aspect, a heads-up display may comprise a viewing screen having a reflective surface, a housing defining an opening, a display element disposed within the housing, and an electro-optic element disposed between the display element and the viewing screen and covering the opening defined by the housing. The electro-optic element may be configured to selectively darken when the heads-up display is not operating. The display element may be capable of causing images to be displayed on the viewing screen.

DETAILED DESCRIPTION

Figure 1:
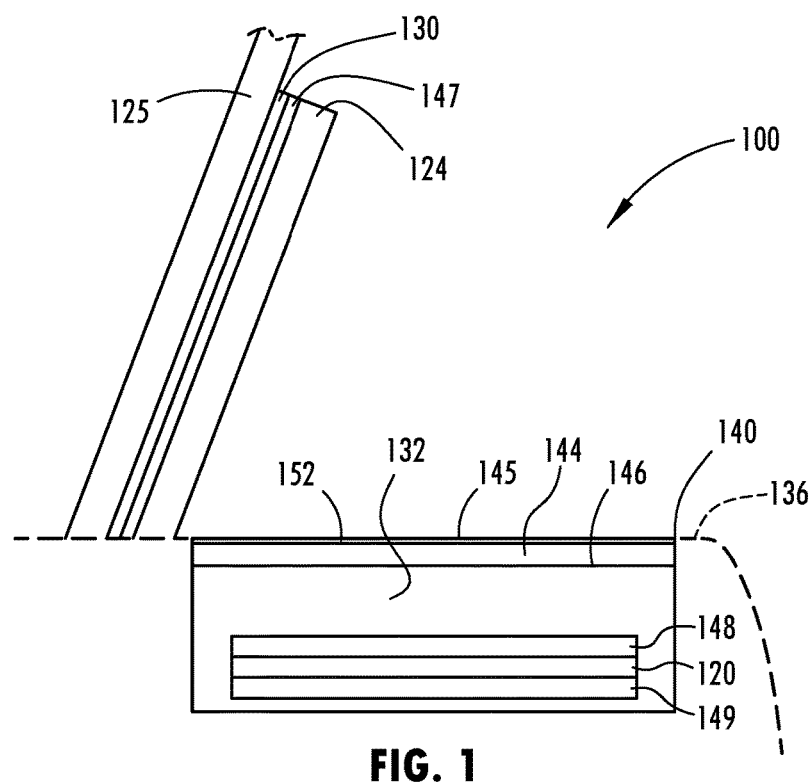
FIG. 1 illustrates a side view of an embodiment of a heads-up display in accordance with an aspect of this disclosure.
Figure 2:
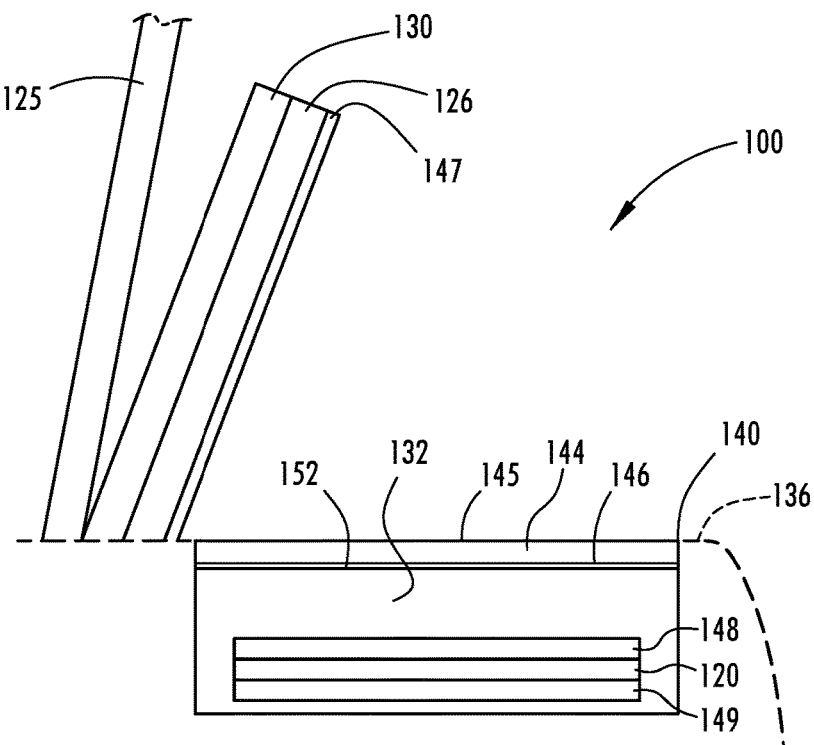
FIG. 2 illustrates a side view of an embodiment of a heads-up display in accordance with an aspect of this disclosure.

Referring to FIGS. 1 and 2, a heads-up display system, shown generally at 100, may be disposed in a vehicle (not shown) and may be configured to display images and/or information to an occupant of the vehicle. Heads-up display system may comprise a display element 120 and a viewing screen 124. Display element 120 may be configured to project images and/or information that is to be displayed to viewing screen 124.

Viewing screen 124 may comprise, for example, a windshield 125 as shown in FIG. 1 or a combiner screen 126 separate from and disposed between windshield 125 and the vehicle occupants as shown in FIG. 2. Viewing screen 124 may be configured to display the projected images and may comprise a reflective layer. In some embodiments, reflective layer may comprise a reflective linear polarizer 147.

In some embodiments, display element 120 may be at least partially disposed in a housing or cavity 132. Housing 132 may also hold other components of heads-up display system 100 such as wiring, connectors, and the like. Housing 132 may be recessed in a surface 136 such as, for example, a dashboard of the vehicle. Housing 132 may define an opening 140 configured to allow optical communication between display element 120 and viewing screen 124. Opening 140 may be generally co-planar with surface 136. A first linear polarizer 144 may extend across opening 140 and may completely cover opening 140. First linear polarizer 144 may be configured to polarize light in a first direction. By polarizing the light, first linear polarizer 144 may be capable of reducing the amount of light entering housing 132. Less light entering housing 132 may reduce or eliminate the illumination of the interior of housing 132 and the components disposed therein. This may prevent vehicle occupants from viewing the components of heads-up display system 100 disposed within housing 132, thereby providing viewers a more aesthetically pleasing appearance.

In some embodiments, display element 120 of heads-up display system 100 may comprise a liquid crystal display (LCD). A typical LCD may comprise a rear integral linear polarizer 149 and a front integral linear polarizer 148 with a liquid crystal material disposed between the two. Front integral linear polarizer 148 may be disposed adjacent to and extend parallel to display element 120, and may be at least partially coextensive with display element 120. Typically, the front integral linear polarizer of a liquid crystal display is designed to primarily cover only the display area, thereby leaving visible the areas around display element 120 including interior of housing 132 and wires, connectors, or other mechanical structures that are disposed within housing 132. Even if the housing conceals these additional components, light reflecting off of the display will appear in contrast to light scattered or reflected off of the internal housing surface. Furthermore, it is likely that the interior of housing 132 will be a different color and/or texture than other components disposed within housing 132. Without further limiting the amount of light that can enter housing 132, the contrast between the interior of housing 132 and components disposed within housing 132 may be visible to vehicle occupants.

Front integral linear polarizer 148 may not be necessary when first linear polarizer 144 is used. In this case, front integral linear polarizer 148 may not be present in display element 120 and its function may be performed by first linear polarizer 144. This configuration will still obscure the internal features of housing 132 while reducing the cost and complexity of the LCD by eliminating one polarizer.

Front integral linear polarizer 148 may be disposed to polarize the light exiting display element 120 in the first direction so light passing through front integral linear polarizer 148 is aligned in the same direction as light passing through first linear polarizer 144. Thus, the transmission of ambient light into housing 132 may be reduced by first linear polarizer 144. This, in turn, may reduce the intensity of the specular and scattered reflection off display and other features that may be housed within housing 132, thus reducing the visibility of components within the housing 132. However, since light leaving display element 120 and passing through front integral linear polarizer 148 is polarized in the same direction as light polarized by first linear polarizer 144, the amount of display light leaving housing 132 is not substantially reduced by first linear polarizer 144. Therefore, the light transmitted to viewing screen 124 for display may not be substantially reduced, and the images displayed on viewing screen 124 may be approximately the same level of brightness as it would be if first linear polarizer 144 were not present.

In some embodiments, reflective linear polarizer 147 may be aligned to reflect the polarization transmitted through first linear polarizer 144. Light reflected from viewing screen 124 may be polarized in the same direction as light striking viewing screen 124 from display element 120.

In some embodiments, viewing screen 124 may optionally comprise an actively or passively tunable, polarizing or non-polarizing filter 130. Actively or passively tunable, polarizing or non-polarizing filter may comprise an electro-optic (EO) element 130 disposed in proximity to viewing screen 124. EO element may be generally parallel to viewing screen 124. EO element 130 may be configured to enhance the visibility of the images displayed on viewing screen 124. EO element 130 may be configured to darken when the ambient light is bright, such as on a sunny day, thereby increasing the contrast between the images displayed on viewing screen 124 and a scene exterior to the vehicle viewed through viewing screen 124. EO element 130 may also be configured to remain clear when there is less ambient light and the contrast between the displayed images and the exterior environment allows viewers to easily view the images displayed on viewing screen 124.

In some embodiments, additional filters may be added to cover opening 140 of housing 132. For example, at least one neutral density filter 152 may be disposed over opening 140. Neutral density filter 152 may comprise a filter that does not significantly change the color image of the light leaving display element. In some embodiments, neutral density filter 152 may be configured to reduce light transmission to below 50% or to between 50% and 80% of the original (unfiltered) light transmission.

First linear polarizer 144 may have a first surface 145 and a second surface 146, each surface extending generally parallel to surface 136. To further reduce the amount of light entering and exiting housing 132, the at least one neutral density filter 152 may be disposed on at least one of first and second surfaces 145, 146 of linear polarizer. Although the at least one neutral density filter 152 may also block a portion of the light produced by display, this may be preferred to filters that may change the color image of the display.

Figure 3:
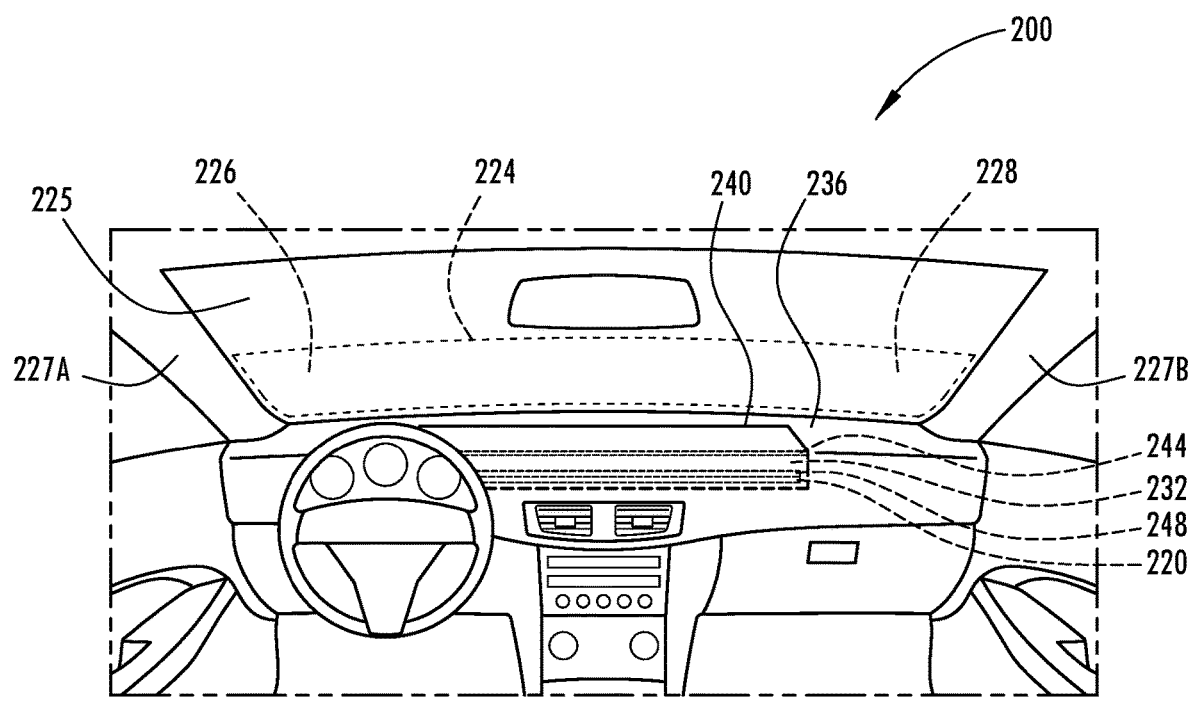
FIG. 3 illustrates a front view of a viewing screen of a heads-up display in accordance with an aspect of this disclosure.

As shown in FIG. 3, in some embodiments, a heads-up display system, generally indicated at 200, may comprise a viewing screen 224 configured to extend along at least a portion of a windshield of a vehicle. In particular, viewing screen 224 may extend along more than half, more than two thirds, more than 75%, more than 80%, or more than 90% of the width of the vehicle windshield. For example, viewing screen 224 may extend generally from one side of a vehicle windshield to a second side of the windshield. Viewing screen 224 may extend, for example, from an A-pillar 227A on the driver's side of a vehicle to an A-pillar 227B on the passenger side of the vehicle. In some embodiments, viewing screen 224 may extend throughout the entire expanse of the windshield. In some embodiments, viewing screen 224 may be incorporated with the windshield itself.

A first portion 226 of viewing screen 224 may extend in front of and be associated with the driver's side of the vehicle and a second portion 228 of viewing screen 224 may extend in front of and be associated with the passenger side of the vehicle. The heads-up display may be configured to display the same images and/or information to both the first portion 226 and the second portion 228 of viewing screen 224 or may display separate images and/or information to the first and second portions 226, 228 of viewing screen 224. In some embodiments, heads-up display may be configured to display images and/or information on first portion 226 of viewing screen 224, and the images and/or information may subsequently be displayed on second portion 228 of viewing screen 224. In some embodiments, heads-up display system may be configured to display images and/or information first to the first portion 226 of viewing screen 224, then to scroll the images and/or information to second portion 228 of viewing screen 224.

Figure 4:
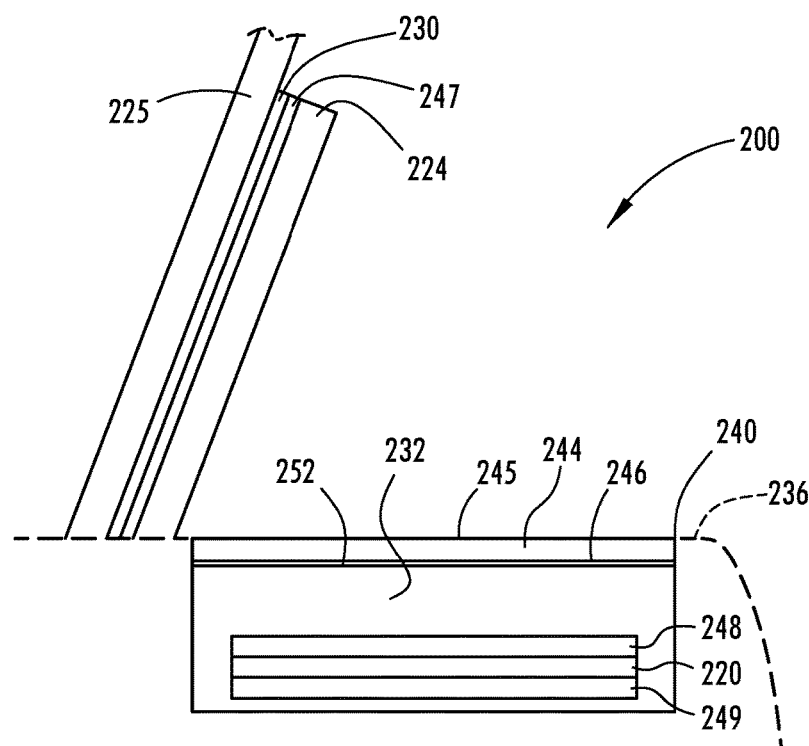
FIG. 4 illustrates a diagram of a heads-up display system in accordance with an aspect of this disclosure.

In some embodiments, heads-up display system may further comprise a display element 220 disposed in an interior of the vehicle as shown in FIG. 4. Display element 220 may comprise an LCD having a rear linear polarizer 249 and a front integral linear polarizer 248. Display element 220 may be disposed within a housing or cavity 232. Housing 232 may be recessed below a surface 236 such as a dashboard of the vehicle. Housing 232 may define an opening 240 configured to allow optical communication between display element 220 and viewing screen 224. Opening 240 may be covered by a first linear polarizer 244. First linear polarizer 244 may be generally co-planar with or flush with surface 236. First linear polarizer 244 may be configured to polarize light in the same direction as light passing through front integral linear polarizer 248. Thus, light may be partially blocked from entering housing 232 by first linear polarizer 244, but light leaving display element 220 and passing through first linear polarizer 244 may not be substantially reduced. This may present a better appearance for display element 220 within housing 232 of display element 220.

In some embodiments, heads-up display system may further comprise an EO element 230. EO element 230 may be disposed in proximity to viewing screen 124 and may be generally parallel to viewing screen 124. EO element 230 may be configured to darken when ambient light is bright to increase the contrast between images on viewing screen 224 and the scene viewed through HUD system 200.

In some embodiments, heads-up display system may further comprise other filters such as a neutral density filter 252. Neutral density filter 252 may be disposed over opening 240. Neutral density filter 252 may be disposed on either side of first linear polarizer 244 if it is desired to further reduce the light entering and exiting housing 232. In some embodiments, neutral density filter 252 may be disposed to be generally parallel to first linear polarizer 244. Neutral density filter 252 may be configured to block a portion of the light produced by display.

Figure 5:
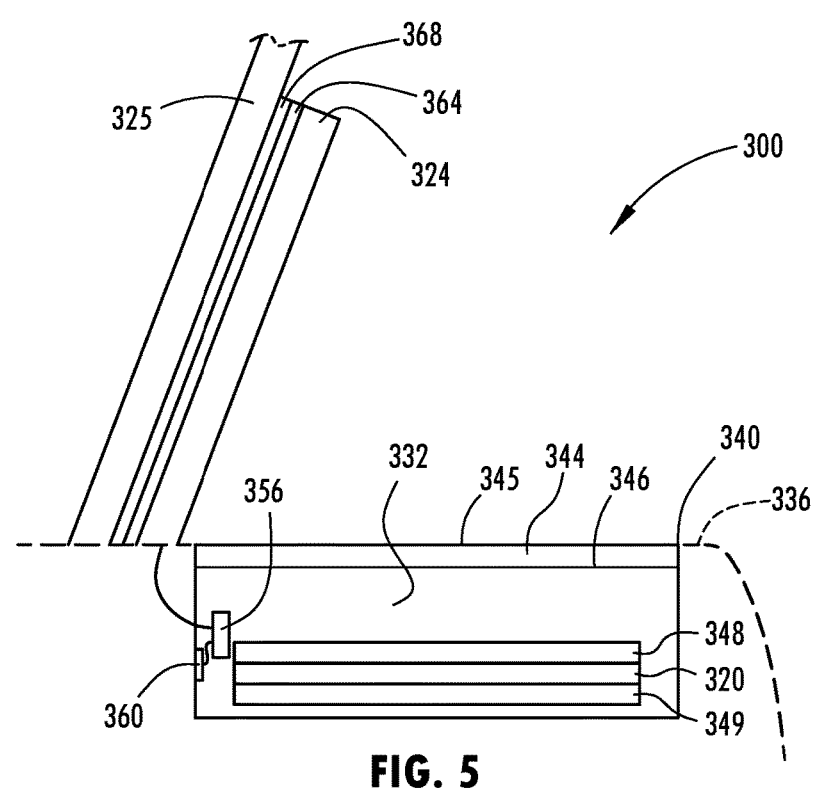
FIG. 5 illustrates a side view of an embodiment of a heads-up display in accordance with an aspect of this disclosure.

As shown in FIG. 5, in some embodiments, a heads-up display system, shown generally at 300, may be disposed within a vehicle. Heads-up display system 300 may comprise a viewing screen 324 disposed on or in front of a windshield 325, and a display element 320. Display element 320 may be configured to project images and/or information to viewing screen 324 for display.

In some embodiments, display element 320 may be at least partially disposed in a housing 332. Housing 332 may also hold other components of heads-up display system 300 such as wiring, connectors, and the like. Housing 332 may be recessed in a surface 336 such as, for example, a dashboard of the vehicle. Housing 332 may define an opening 340 configured to allow optical communication between display element 320 and viewing screen 324. An EO element 343 capable of darkening and clearing to control light transmission through EO element may extend across opening 340 and may completely cover opening 340. EO element 343 may be generally co-planar with surface 336.

In some embodiments, EO element 343 may be in communication with a controller 356. Controller 356 may be configured to receive an input upon a determination that heads-up display system 300 is off. Controller 356 may be configured to cause EO element 343 to darken to reduce light transmission into housing upon the receipt of the input indicating that the heads-up display is off. Darkening EO element 343 may reduce the amount of light entering housing 332, thereby reducing the appearance of the interior of housing 332 and the components housed within housing 332.

In some embodiments, EO element 343 may be in communication with a controller 356 and with a sensor 360. Upon receiving an input from sensor 360 that ambient light in a particular area, such as external to the vehicle or within housing 332, is above a predetermined level, controller 356 may be configured to cause EO element 343 to darken. Darkening of EO element 343 may reduce the amount of light passing through EO element into housing, thereby reducing the visibility of HUD components that may be housed within housing 332. This may prevent vehicle occupants from viewing the components of heads-up display system 300 disposed within housing 332, thereby providing viewers a more aesthetically pleasing appearance.

Heads-up display system 300 may further comprise at least one of a reflective linear polarizer 364 and an EO element 368 in proximity with viewing screen 324.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point. The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal.

In some embodiments, "substantially" may denote values within at least one of 2% of each other, 5% of each other, and 10% of each other.

The invention claimed is:

1. A heads-up display comprising:
a viewing screen having a reflective surface;
a housing having an opening;
a display element disposed within the housing and in optical communication with the viewing screen;
a first electro-optic, element disposed to cover the opening, the first electro-optic element capable of darkening and clearing based on ambient light conditions received from an ambient light sensor disposed used within the housing and
a first linear polarizer disposed to cover the opening and configured to polarize light in a first direction;
wherein the display element comprises an integral linear polarizer configured to polarize light in the first direction; and
wherein the viewing screen reflects the light in the first direction that is transmitted through the first linear polarizer from the display element to display images.

2. The heads-up display of claim 1, further comprising a second electro-optic element disposed on a surface of the viewing screen.

3. The heads-up display of claim 2, wherein the second electro-optic element is capable of darkening and clearing based on ambient light conditions.

4. The heads-up display of claim 2, wherein the second electro-optic element is configured to be in a darkened state when the heads-up display is not operating.

5. The heads-up display of claim 1, wherein the viewing screen comprises a reflective polarizer.

6. The heads-up display of claim 1, wherein the viewing screen has a reflectance greater than about thirty percent.

7. The heads-up display of claim 1, further comprising a neutral density filter disposed generally parallel to and in proximity to the first linear polarizer.

8. A heads-up display disposed within a vehicle, comprising:
a viewing screen extending generally along at least half of a width of the windshield of the vehicle; and
a display element capable of causing images to be displayed on the viewing screen;
wherein the display element is capable of displaying a first set of images on a first portion of the display element and a second set of images on a second portion of the display element;
a housing defining an opening, wherein the display element is disposed within the housing;
a first electro-optic element extending across and covering the opening; wherein
the first electro-optic element is capable of darkening and clearing based on ambient light conditions received from an ambient light sensor disposed within the housing;
the first portion of the display element is associated with a first occupant position of the vehicle;
and wherein the second portion of the display element is associated with a second occupant position of the vehicle.

9. The heads-up display of claim 8, wherein the first set of images is the same as the second set of images.

10. The heads-up display of claim 8, wherein the display element is capable of displaying the first set of images on the first portion of the display element, then displaying the first set of images on the second portion of the display element.

11. The heads-up display of claim 10, wherein, when the first set of images is being displayed on the second portion of the display element, a third set of images is being displayed on the first portion of the display element.

12. The heads-up display of claim 8, wherein the housing is recessed into a surface of a dashboard of the vehicle.

13. The heads-up display of claim 12, further comprising a linear polarizer disposed to cover the opening defined by the housing;
wherein the linear polarizer is generally co-planar with the surface of the dashboard.

14. The heads-up display of claim 8, further comprising a second electro-optic element disposed on a surface of the viewing screen.

15. The heads-up display of claim 14, wherein the second electro-optic element is configured to be in a darkened state when the heads-up display is not operating.

16. The heads-up display of claim 8, wherein the viewing screen comprises a reflective polarizer.

17. A heads-up display system, comprising:
a viewing screen extending generally along at least half of a width of a windshield of a vehicle and having a reflective surface;
a housing defining an opening;
a display element disposed within the housing and capable of causing images to be displayed on the viewing screen;
an electro-optic element extending across and covering the opening, the electro-optic element capable of darkening and clearing based on ambient light conditions received from an ambient light sensor disposed used within the housing: and
a first linear polarizer disposed to cover the opening defined by the housing and configured to polarize light in a first direction;
wherein the display element comprises an integral linear polarizer configured to polarize light in the first direction, and further wherein the viewing screen reflects the light in the first direction that is transmitted through the first linear polarizer directly from the display element.

18. The heads-up display system of claim 17, wherein the display element is capable of displaying a first set of images on a first portion of the display element and a second set of images on a second portion of the display element;
wherein the first portion of the display element is associated with a first occupant position of the vehicle; and
wherein the second portion of the display element is associated with a second occupant position of the vehicle.

19. The heads-up display system of claim 17, further comprising a second electro-optic element disposed on a surface of the viewing screen;
wherein the second electro-optic element is capable of darkening and clearing based on ambient light conditions.

* * * * *

UNITED STATES PATENT AND TRADEMARK OFFICE
CERTIFICATE OF CORRECTION

PATENT NO. : 11,709,381 B2
APPLICATION NO. : 17/140475
DATED : July 25, 2023
INVENTOR(S) : Cammenga et al.

It is certified that error appears in the above-identified patent and that said Letters Patent is hereby corrected as shown below:

In the Claims

Column 9, Line 11, delete ",";
Column 9, Line 14, delete "used";
Column 9, Line 15, after "housing" insert --;--;
Column 9, Line 53, move "wherein" to beginning of next paragraph;
Column 9, Line 60, move "and" to end of previous paragraph;
Column 10, Line 37, delete "used"; and
Column 10, Line 38, ":" should be --;--.

Signed and Sealed this
Twelfth Day of December, 2023

Katherine Kelly Vidal
*Director of the United States Patent and Trademark Office*